United States Patent
Taniguchi

(10) Patent No.: US 7,081,965 B2
(45) Date of Patent: Jul. 25, 2006

(54) IMAGE FORMING SYSTEM AND METHOD FOR CONTROLLING THE SAME

(75) Inventor: Masahiko Taniguchi, Kawasaki (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 965 days.

(21) Appl. No.: 09/906,093

(22) Filed: Jul. 17, 2001

(65) Prior Publication Data

US 2003/0016381 A1    Jan. 23, 2003

(51) Int. Cl.
  *G06F 3/12*    (2006.01)
(52) U.S. Cl. .................... 358/1.15; 358/1.15; 347/14; 707/8; 707/9
(58) Field of Classification Search .................. 347/14; 358/1.15; 717/120; 707/9, 8
  See application file for complete search history.

(56) References Cited

U.S. PATENT DOCUMENTS 5,579,472 A * 11/1996 Keyworth et al. .......... 715/751
6,025,924 A * 2/2000 Miura et al. ................ 358/1.15
6,076,103 A * 6/2000 Sakai .......................... 709/217
6,585,154 B1 * 7/2003 Ostrover et al. ............. 235/375

FOREIGN PATENT DOCUMENTS

JP    2000-354126    12/2000

* cited by examiner

*Primary Examiner*—Kimberly Williams
*Assistant Examiner*—Yixing Qin
(74) *Attorney, Agent, or Firm*—Foley & Lardner LLP

(57) ABSTRACT

The present invention relates to an image forming system and a control method thereof and is characterized as follows. In a client personal computer, at least application software for display a list having a predetermined structure for synchronizing electronic information and image information, and electronic information are stored. The application software is started, and stored electronic information or image information transmitted from a composite type image forming apparatus through a network is checked in into the list. Otherwise, electronic information, which has been existing on the list, is checked out onto the image forming apparatus or a network printer. Further, the image information and the electronic information are synchronized.

14 Claims, 17 Drawing Sheets

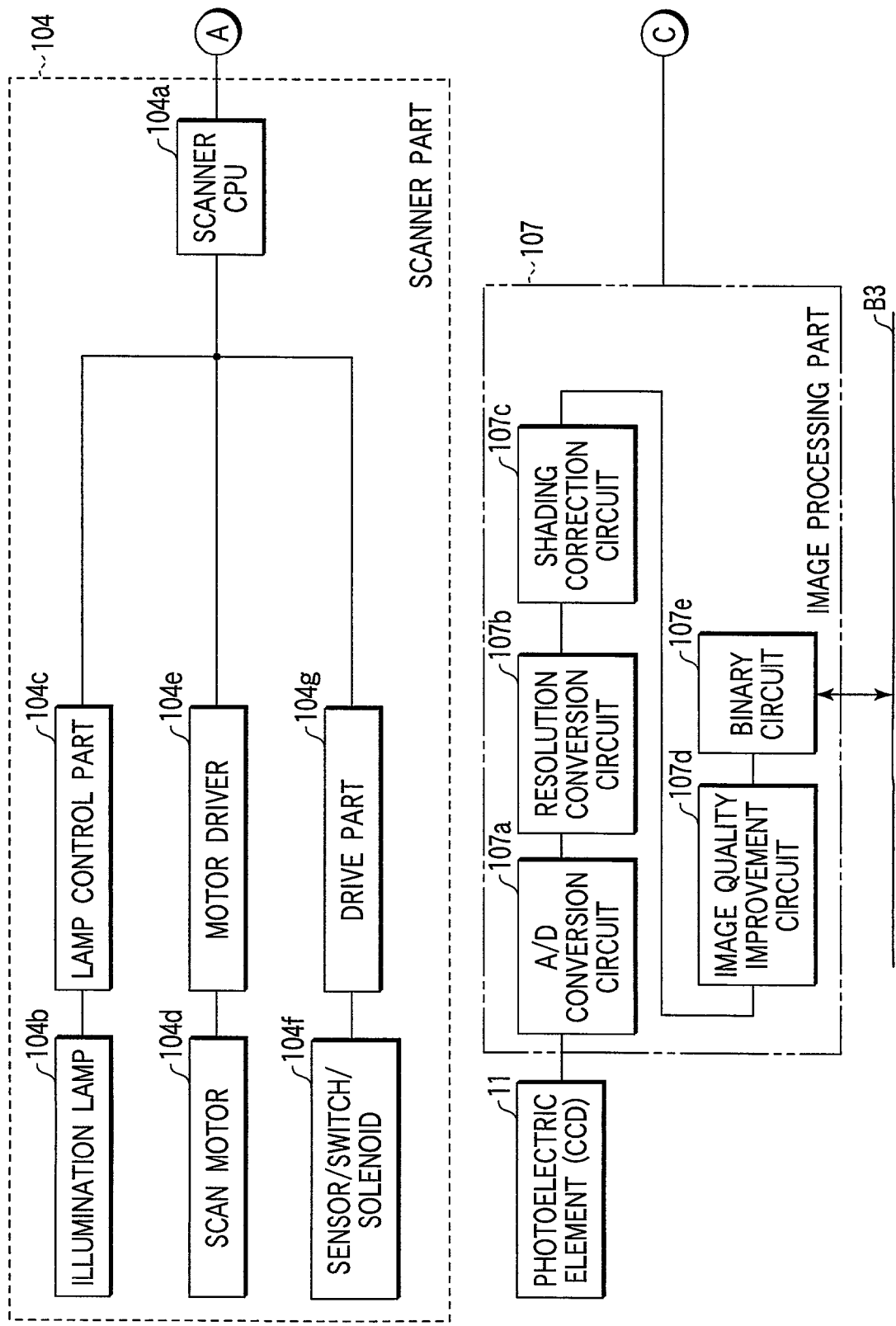
F I G. 3

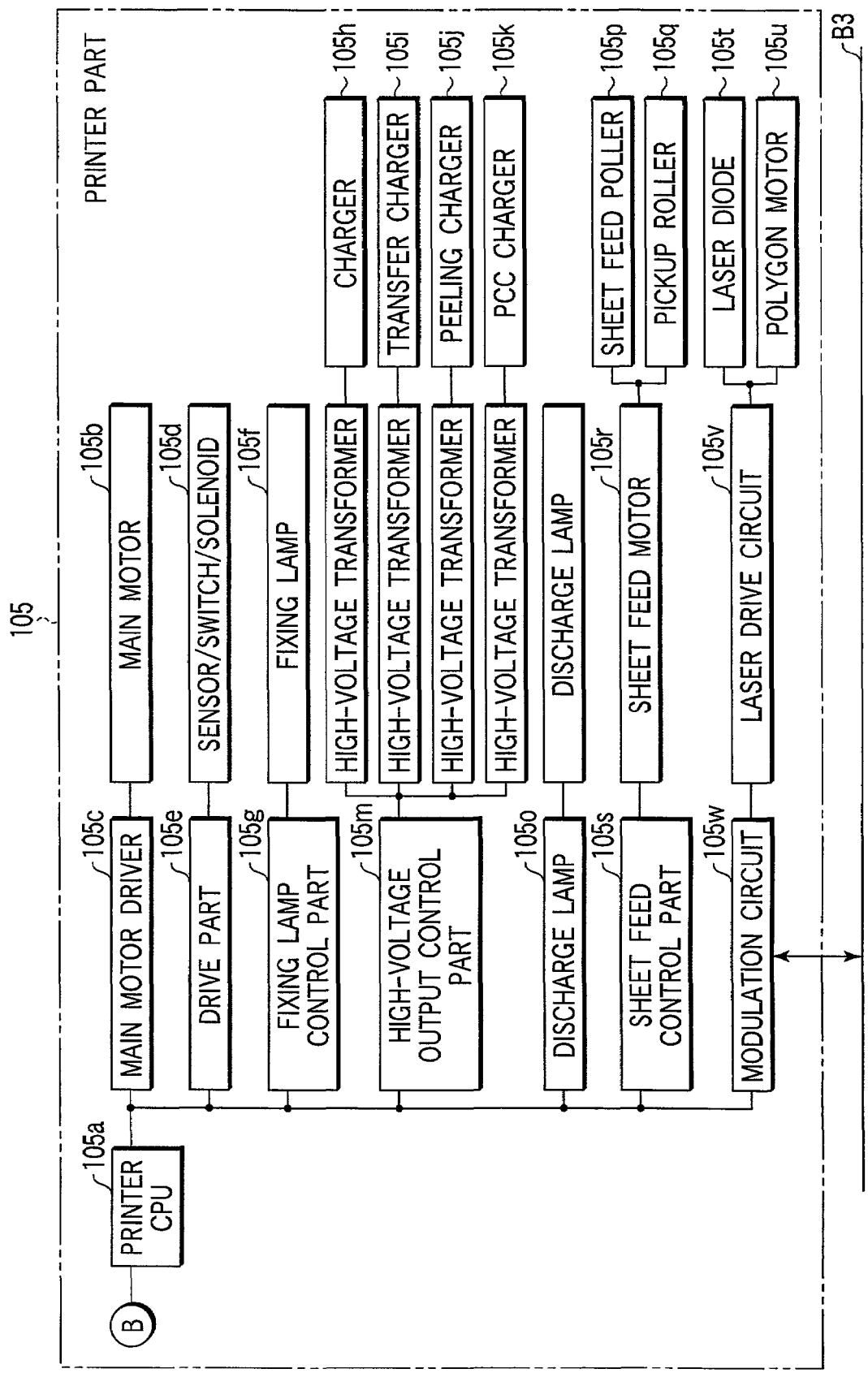
F I G. 4

| INFORMATION SYNCHRONIZER | | | | | |
|---|---|---|---|---|---|
| FILE (F) CHECK-OUT (C) MANAGEMENT (A) HELP (H) | | | | | |
| Filename | Size | Entry date | Status | Destination | Memo |
| a.out | 133k | 2001/1/1 | Check-in | NONE | |
| foo.txt | 110k | 2001/3/5 | Check-out | PC | |

FIG. 8

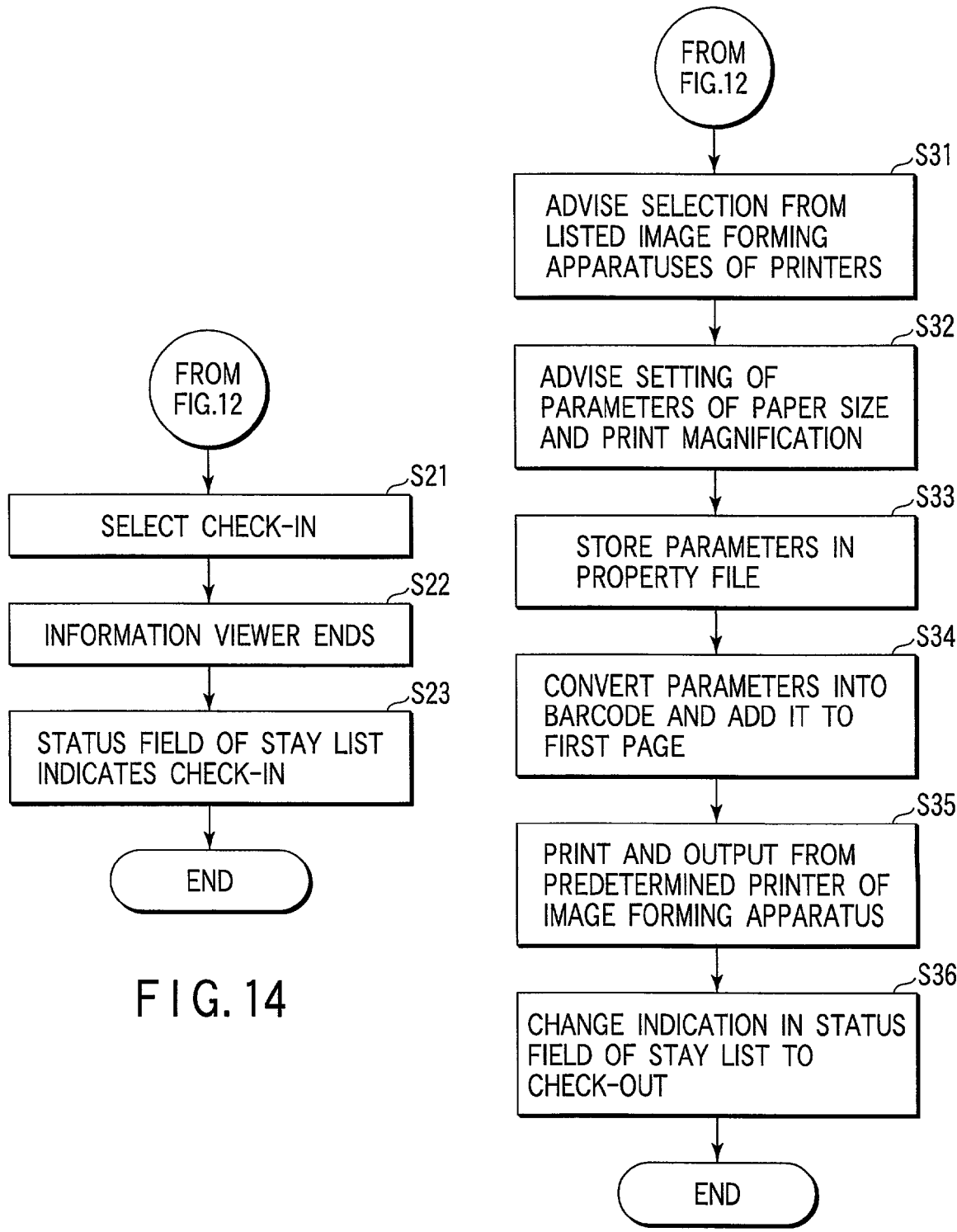

SET DOCUMENT TO CHECK IN ON
AUTOMATIC DOCUMENT FEEDER
WITH THIS FACE ORIENTED UPWARD.
FIG. 16

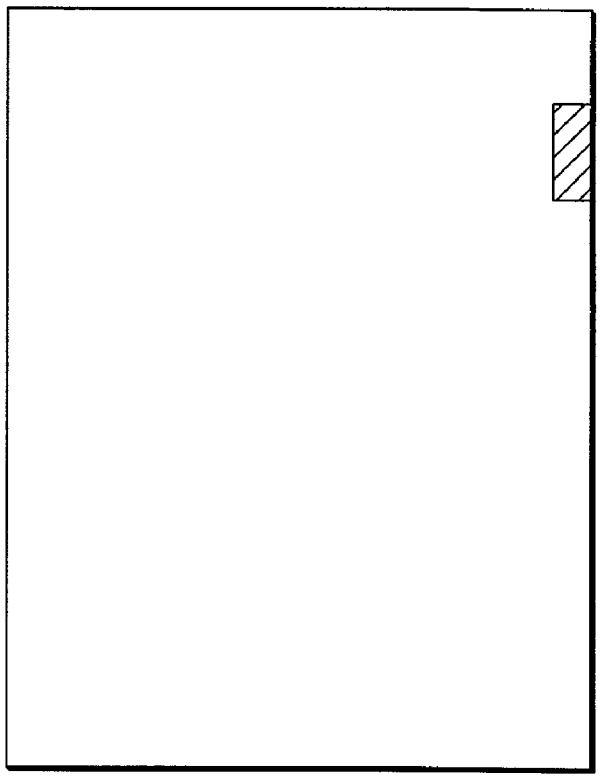
F I G. 18
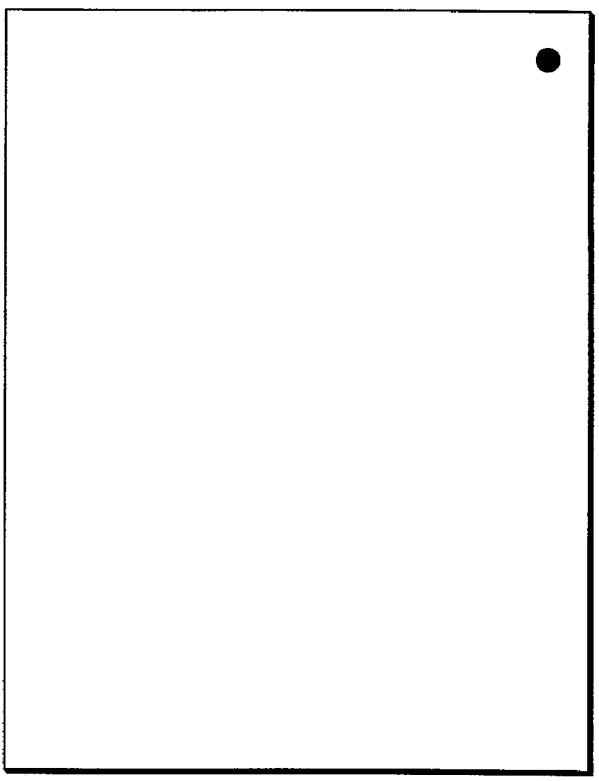
F I G. 19

IMAGE FORMING SYSTEM AND METHOD FOR CONTROLLING THE SAME

BACKGROUND OF THE INVENTION

In recent years, developments have been made in the digitalization of image forming apparatuses, and in the integration of the image forming apparatus and peripheral devices. This composite type image forming apparatus incorporates internally all of the various functions which have been a realized by optional independent apparatuses.

The various functions described above are a scanner function, printer function, facsimile transmission/reception function, image processing function, network connection function, file storage function, graphical user interface function, and the like.

This composite type image forming apparatus has interfaces for connection to various digital devices. The interfaces are, for example, a network interface, IEEE 1394, Bluetooth, and the like. These days, a composite-type image forming apparatus is connected with a plurality of personal computers, a network printer, and the like, through a network or the like, to construct an image forming system. Thus, use of the system by a number of users is realized through the network.

Also, these days, a scanner function and a file storage function of the composite-type image forming apparatus are combined in addition to a network printer function as a main usage of the apparatus. By this combination, a personal storage area for a user is secured in the image forming apparatus, and data scanned by the image forming apparatus is stored into the storage area. The scanned data can then be dealt with by a personal computer through the network.

Although image forming apparatuses have become composite and connection with digital devices have been developed by making compatibility with networks, the flow of image information is always in one direction.

For example, with respect to a network printer, an original of image information is electronic information existing in a personal computer on a network.

A network printer serves only to convert this electronic information into paper information, i.e., media conversion in one direction. Also, the scanner function of a composite-type image forming apparatus achieves only one-directional media conversion from paper information into electronic information so that the information flows to a personal computer on a network.

Specifically, original information electronically exists in a user's personal computer on a network, in conventional cases. If information is newly processed, added to, or corrected after information is outputted to a sheet of paper with use of the network printer function of an image forming apparatus, it is necessary to process, add to, or correct electronic information in a conventional method. This is just caused by the fact that the flow of information is in one direction in conventional techniques.

In general, in the technical field of CAD (Computer Aided Design) or the like, synchronization of information is achieved by dealing with electronic information on a personal computer. More specifically, in the case of CAD, when a user is editing CAD data, synchronization is taken such that another user cannot edit the CAD data. This inhibits synchronization of CAD data.

In addition, as related art, Japanese Patent Application KOKAI Publication 2000-354126 discloses an image processing system. This technique is characterized in that operation levels on an operation screen of an image reading apparatus respectively correspond to directory levels for recording images of file servers and that change points in the levels are mutually reflected on the levels.

BRIEF SUMMARY OF THE INVENTION

The present invention has been made in view of the above problem and has an object of providing an image forming system and a control method thereof, which can achieve integrated management and operation of use states of various functions and the electronic information of an image forming apparatus, so that synchronization and unitary management of mutually communicated electronic information can be realized.

More specifically, the object is to enable synchronization between original electronic information existing in a personal computer and paper information in which information, marks, labels, indexes, and the like are added to a sheet of paper in a hand-writing manner.

To achieve the above objects, an image forming system according to the present invention comprises a composite type image forming apparatus, a network printer, and a client personal computer which are mutually connected to be able to communicate with each other through a network, wherein the composite type image forming apparatus includes a scanner section which reads an image of an original document, and a printer section which performs predetermined printing, based on image information obtained by the scanner section or transmitted through the network from the client personal computer, the network printer includes a communication section which receives image information transmitted from the client personal computer or the composite type image forming apparatus through the network, and a printer section which performs printing based on the image information, the client personal computer includes a storage section which stores at least application software to display a list having a predetermined structure for synchronizing electronic information and image information, and electronic information, a display section which displays the list, and a control section which starts the application software, and checks in electronic information stored in the storage section or image information transmitted from the composite type image forming apparatus through the network onto the list or checks out electronic information, which has existed on the list displayed on the display section, onto the image forming apparatus or the network printer, and synchronizes the image information and the electronic information.

Further, a method of forming an image according to the present invention is based on an image forming system comprising a composite type image forming apparatus, a network printer, and a client personal computer which are mutually connected to be able to communicate with each other through a network, and comprises: a step of storing at least application software to display a list having a predetermined structure for synchronizing electronic information and image information, and electronic information; a step of displaying the list; a step of starting the application software and checking in stored electronic information or image information transmitted from the composite type image forming apparatus through the network, onto the list; a step of checking out electronic information, which has been existing on the list, onto the image forming apparatus or the network printer; and a step of synchronizing the image information and the electronic information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram showing specifically the structures of a scanner section 104 and an image forming section 107;

FIG. 4 is a diagram showing specifically the structure of a printer section 105;

FIG. 8 is a view showing a main window of Information Synchronizer;

FIG. 14 is a flowchart showing a flow of check-in from a client PC;

FIG. 15 is a flowchart specifically explaining a procedure of check-out to a network printer from a stay list in the image forming system according to the present invention;

FIG. 16 is a view showing an example of a cover page added with a barcode;

FIG. 18 is a view showing a state in which an electronic tag is changed into paper information and expressed as a color at an end section of the paper; and FIG. 19 is a view explaining an advantage of a tag in case of check-in from a sheet of paper.

DETAILED DESCRIPTION OF THE INVENTION

Embodiments of the present invention will be explained with reference to the drawings.

Figure 1:
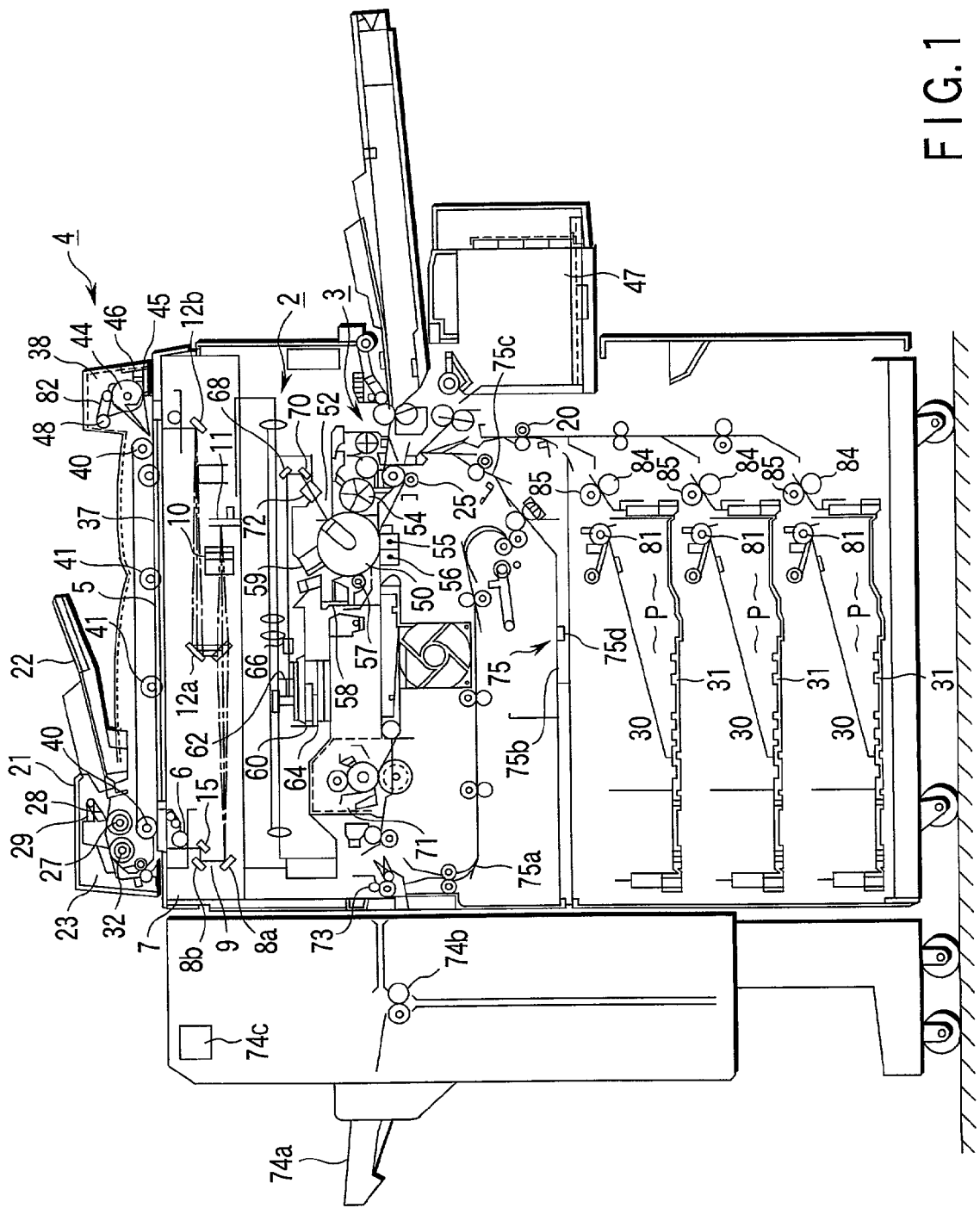
FIG. 1 is a view schematically showing the entire structure of an image forming apparatus as a component of an image forming system according to an embodiment of the present invention.

FIG. 1 schematically shows the entire structure of an image forming apparatus as a component forming section of an image forming system according to an embodiment of the present invention, and explanation thereof will now be made below.

As shown in FIG. 1, an image forming apparatus 1 internally comprises a scanner section 2 and a printer section 3. Further, an automatic document feeder 4 (hereinafter called an ADF) is installed on the image forming apparatus 1.

In the ADF 4, a rear end section of a cover body 21 is installed on an upper rear end edge section of the device body by a hinge device not shown, such that the cover body 21 can be opened and closed. If necessary, the entire ADF 4 can be opened to release the upper side of a document table 5.

Another document table 22 capable of holding a plurality of sheets of an original document is provided at a portion on the upper surface of the cover body 21 at a slightly right-hand section. Provided at an end side of the apparatus is a feed section 23 for picking up, one after another, sheets of an original document and to feed them to an end side of the document table 5 (at the left end side in the figure). The feed section 23 includes a pickup roller 27, a weight plate 28, an empty sensor 29, and the like. This pickup roller 27 serves to pick out the original document. The weight plate 28 serves to press the original document to the pickup roller. The empty sensor 29 serves as an original document sensor which senses the setting status of an original document on the document table 22. Further, the pickup roller 27 is provided with a sheet feed roller 32 at a position in the document pickup direction. Sheets of an original document are securely fed one after another by the sheet feed roller 32.

On the upper surface of the document table 5, a document feed belt 37 is tensioned so as to cover the document table 5. This document feed belt 37 is comprised a wide endless belt having a white outer surface, and tensioned between paired belt rollers 40. Further, the document feed belt 37 is structured to be capable of running in positive and negative directions by a belt drive mechanism not shown.

In the side of the back surface of the inner peripheral section of the document conveyor belt 37, a plurality of belt press rollers 41 and a set switch not shown for detecting the open/close status of the ADF 4. In this structure, an original document fed by the feed section 23 is conveyed from an end side (the left end side) of the document table 5 to another end side (the right end side) thereof.

A sheet discharge section 38 is provided at a portion in the right side of the image forming apparatus. The sheet discharge section 38 includes a feed roller 44, a pinch roller 45 for pressing an original document to the feed roller 44, a sheet discharge sensor 46 for detecting a rear end of an original document fed in the sheet-discharge direction, and the like. A sheet discharge roller 48 is provided in the downstream side on the document discharge route. Also, a gate 82 for reversing an original document and for guiding it to the document table 5 is provided on the document discharge route. Double-side copying of an original document is enabled by the gate 82.

Meanwhile, the scanner section 2 includes an illumination lamp 6, a first carriage 7, a second carriage 9, a lens 10, a CCD sensor 11, an optical system not shown, an A/D conversion section not shown, and the like. This illumination lamp 6 operates as a light source. A mirror 15 is provided on the first carriage 7. Mirrors 8a and 8b for refracting the light path are provided on the second carriage 9. The CCD sensor 11 serves to receive reflection light. A drive system not shown serves to change the position of each section. The A/D conversion section not shown serves to convert the output of the CCD sensor 11, i.e., image data from analogue data into digital data.

The fist carriage 7 and second carriage 9 are connected with each other by a timing belt not shown. Further, the second carriage 9 can move at a half speed of the first carriage, in one same direction. By this operation, scanning is enabled such that the length of the light path is constant. The above-described lens 10 can be moved in the optical axis direction when changing the magnification with the focus distance fixed.

One pixel of an original document corresponds to one image pixel of the CCD sensor 11. The output of the CCD sensor 11 is supplied to the A/D conversion section not shown.

The first carriage 7, second carriage 9, mirrors 12a and 12b are constructed so as to move by means of a stepping motor not shown. The first carriage 7 and the second carriage 9 are constructed so as to move in accordance with the motion of a timing belt not shown, which is tensioned between an idle pulley not shown and a drive pulley not shown but connected with the rotation shaft of the stepping motor.

As a spiral shaft not shown is rotated by the stepping motor not shown, the lens 10 moves in the optical axis direction in accordance with the motion of the spiral shaft. A collimator lens 62, a polygon mirror (poly-mirror) 64, a lens 66, reflection mirrors 68 and 70, and a lens 72 are provided in correspondence with a laser diode 60. In this structure, a laser beam is irradiated on a photosensitive drum 50 from an exposure device 52.

The printer section 3 combines, for example, a laser optical system with an electrophotographic method capable of forming an image on a transfer paper. That is, the printer section 3 has a photosensitive drum 50 which is rotatably supported at a substantial central section in the apparatus.

An exposure device 52, a developing device 54, a transfer charger 55, a peeling charger 56, a PPC charger 57, a discharge lamp 58, and a charger 59 are provided in this order around the photosensitive drum 50.

The photosensitive drum 50 is charged uniformly by the charger 59 and also outputs a laser beam from the scanner section 2, to form an image of an original document on the photosensitive drum 50.

Further, an electrostatic latent image formed on the photosensitive drum 50 is developed by the developing device 54. A developed image is transferred to a copy paper P fed through a sheet feed roller 20 and an aligning roller 25 from a sheet feed cassette 30 as a sheet feed means described later, by the transfer charger 55.

The copy paper P after the transfer made by the transfer charger 55 is peeled by the peeling charger 56 based on AC corona discharge. Thereafter, the copy paper P is conveyed to a fixing device 71 through the conveyor belt. Further, the copy paper P on which the developed image is melted and fixed by the fixing device 71 is fed out to a unit 74 having a discharge tray 74a by paired discharge rollers 73.

Further, this unit 74 has paired rollers 74b for facing down the copy paper P discharged from the paired rollers 73. Further, the unit 74 has, at an upper section thereof, a stapler 74c for stapling every set of papers in the staple sort mode.

Meanwhile, the developing agent, which remains on the photosensitive drum 50 after transfer of a developed image onto a copy paper P and peeling of the paper, is cleaned by the PCC charger 57. Further, the potential on the photosensitive drum 50 is set to a predetermined level or lower by the discharger 58. Thus, next copy operation is enabled.

In case of double-side copying in which printing is performed on both surfaces of a copy paper P, a copy paper P on which a developed image is melted and fixed by the fixing device 71 described above is conveyed through a convey route 75a and is then compiled on a tray 75b. A copy paper P on one surface of which printing has been done is conveyed to the transfer charger 55 through a convey route 75c, and a developed image is transferred to the other surface which has not yet been subjected to printing.

Also, a sheet of paper sensor 75d of light reflection type is provided at a lower section of the tray 75b. By this paper sensor 75d, the presence or absence of a sheet of paper stacked on the tray 75b is detected. An automatic double-side device (hereinafter called an ADD) as an automatic double-side reverse mechanism is constructed by the convey route 75a, tray 75b, convey route 75c, and paper sensor 75d. In the figure, the reference symbol 30 denotes sheet feed cassettes which are attached in a plurality of stages, to be detachable from the front side of the apparatus body 1.

Further, each sheet feed cassette 30 is comprised of a cassette case 31 as a casing which contains copy papers P. The pick-up end of the cassette case 31 is structured to be inclined in the direction in which papers are picked out.

Further, copy papers P contained in the cassette case 31 are picked up, in the order from the uppermost sheet, by a pickup roller 81. Copy papers P picked up by the pickup roller 81 and fed to the side of the pick-up end of the cassette case 31 are separated, one after another, at a sheet of paper separation section comprised of a sheet feed roller 84 and a separation roller (or separation pad) 85 provided at an upper section inside the pick-up end section of the cassette case 31 and are then conveyed toward the printer section 3.

Next, the control system of the image forming apparatus as a section of the image forming system according to the embodiment will be shown in FIG. 2 and explained below.

Figure 2:
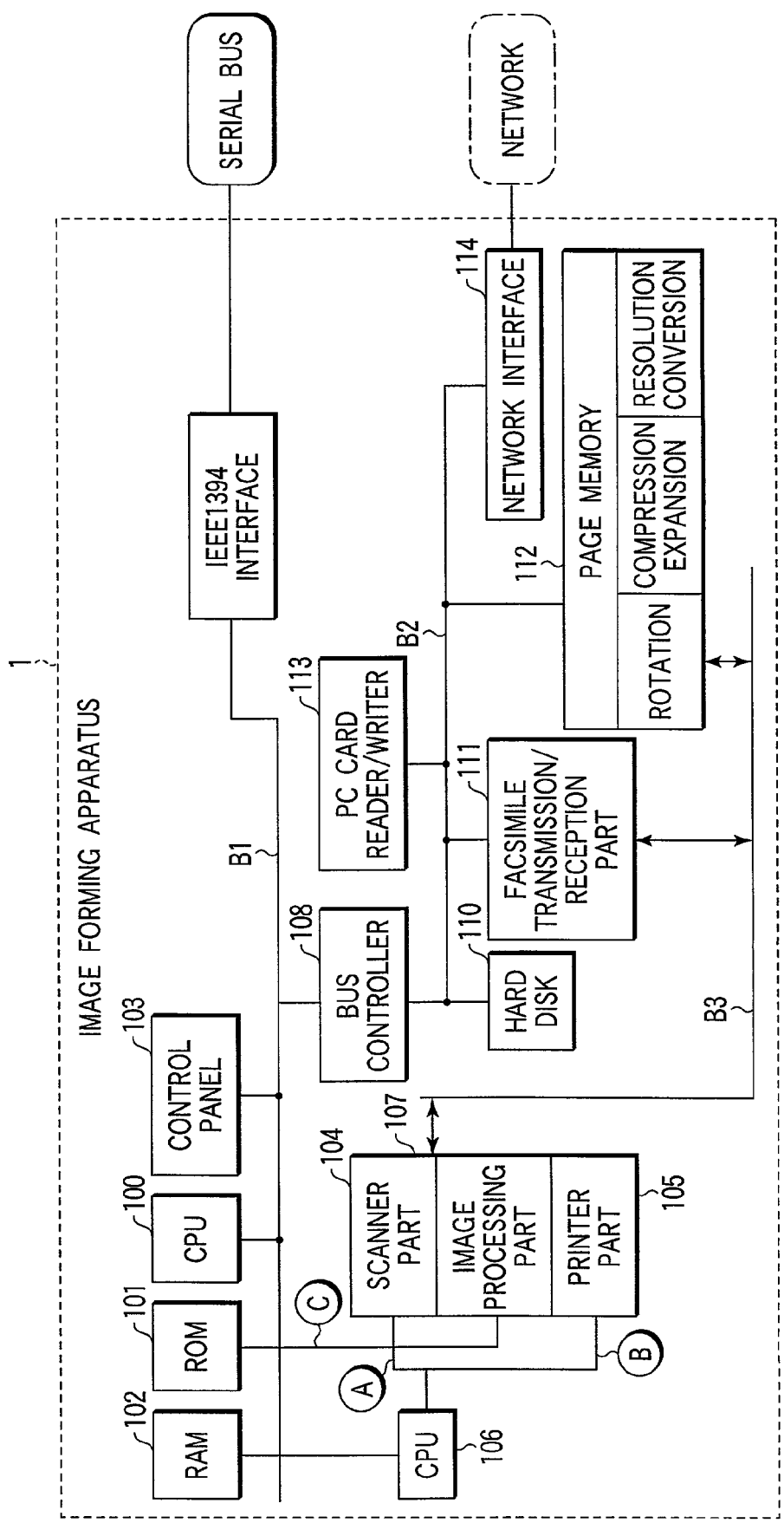
FIG. 2 is a diagram showing the structure of a control system of the image forming apparatus as a section of the image forming system according to the embodiment.

In FIG. 2, in the image forming apparatus 1, a CPU 100 controls the entire apparatus, a control panel 103, a mechanical section control CPU 106, an image processing section 107, a bus controller 108, a ROM 101, a RAM 102, and a finger identification section are connected through a control bus B1. The CPU 100 controls these sections.

Further, the bus controller 108 is connected with a hard disk 110, a facsimile transmission/reception section 111, a page memory 112, and a network interface 114 through a control bus B2.

The CPU 100 controls the hard disk 110, facsimile transmission/reception section 111, page memory 112, and network interface 114 through the bus controller 108 and the control bus B2.

Further, the image processing section 107, printer section 105, facsimile transmission/reception section 111, and page memory 112 transmits/receives image data through an image bus B3. Also, image data can be transmitted/received among the hard disk 110, page memory 112, facsimile transmission/reception section 111, and network interface 114 through the control bus B2.

In addition, the scanner section 104, printer section 105, and facsimile transmission/reception section 111 can independently operate.

Next, the specific structure of the scanner section 104 and image processing section 107 will be explained with reference to FIG. 3.

In FIG. 3, the scanner CPU 104a of the scanner section 104 is connected with a lamp control section 104c, a motor driver 104e, and a drive section 104g. The lamp control section 104c drives an illumination lamp 104b. The motor driver 104e controls a scan motor 104d. The drive section 104g drives and controls components 104f such as a sensor, a switch, a solenoid, and the like.

The output of the CCD sensor 11 is connected to the input of an A/D conversion circuit 107a in the image processing section 107. The output of this A/D conversion circuit 107a is connected to the image bus B3 through a resolution conversion circuit 107b, a shading correction circuit 107c, an image quality improvement circuit 107d, and a binary circuit 107e.

The image data thus read by the CCD sensor 11 is transmitted to a page memory 112 through the image bus B3 from the binary circuit 107e of the image processing section 107 and is stored into the page memory 112.

Next, the detailed structure of the printer section 105 will be explained with reference to FIG. 4.

In FIG. 4, the printer CPU 105a of the printer section 105 is connected with a main motor driver 105c, a drive section 105e, a fixing lamp control section 105g, a high-voltage control section 105m, a discharge lamp control section 105o, a sheet feed control section 105s, and a conversion circuit 105w. The main motor driver 105c serves to drive the main motor 105b. The drive section 105e serves to drive and control components 105d such as a sensor, a switch, a solenoid, and the like. The fixing lamp control section 105g serves to drive and control the fixing lamp 105f.

The high-voltage output control section 105m serves to control an electrification charger 105h, a transfer charger 105i, a peeling charger 105j, and a PPC charger 105k. The discharge lamp control section 105o serves to control a discharge lamp 105n. The sheet feed control section 105s serves to control a sheet feed motor 105r for a sheet feed roller 105p and a pickup roller 105q. The conversion circuit 105w serves to drive a laser drive circuit 105v for a photoelectric conversion section (laser diode) 105t and a polygon motor 105u.

By the printer section 105 having this structure, the image data supplied from the page memory 112 through the image bus B3 is printed on a predetermined paper under control from the printer CPU 105a.

Next, the detailed structure of the facsimile transmission/reception section 111 will be explained with reference to FIG. 5.

Figure 5:
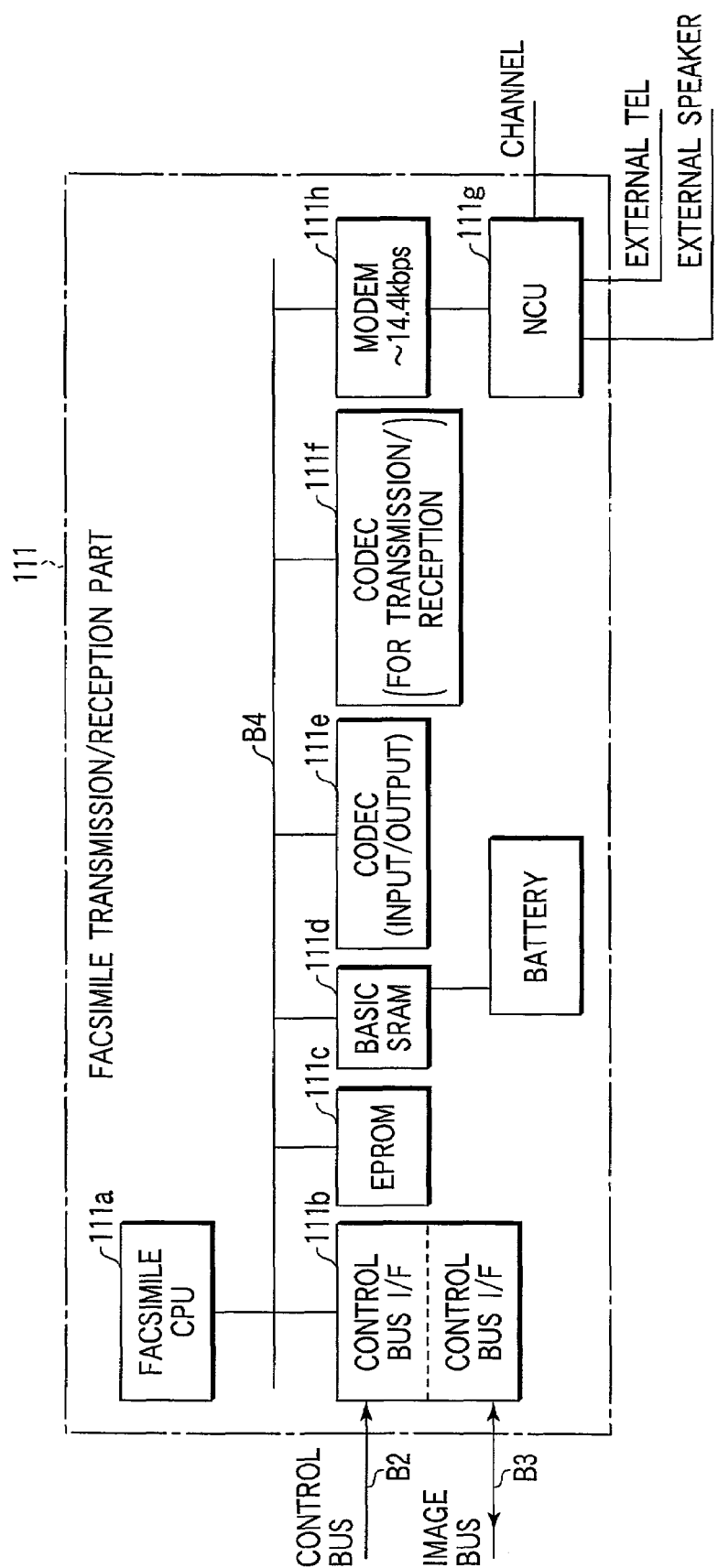
FIG. 5 is a diagram showing specifically the structure of a facsimile transmission/reception section 111.

In FIG. 5, the facsimile CPU 111a which controls the facsimile transmission/reception section 111 is connected with an interface control circuit 111b, a memory (EEPROM) 111c, a memory (SRAM) 111d, a CODEC 111e, a CODEC 111f, and a modem 111h.

The interface control circuit 111b comprises a control bus interface and an image bus interface section. The memory (EEPROM) 111c stores control programs. The CODEC 111e serves to compress and expand image data at the time of input and output. The CODEC 111f serves to perform compression and expansion when image data is transmitted and received. The modem 111h is connected to a communication line and serves to perform modulation and demodulation to transmit and receive data through a NCU (Network Control Unit 111g) which controls, for example, a public line network.

In the facsimile transmission/reception section 111 having this kind of structure, processing such as compression or the like is performed on image data transmitted through the image bus B3 and is then outputted to a communication line. At the same time, processing such as expansion or the like is performed on image data received through a communication line and is transmitted to the page memory 112 through the image bus B3. The image data is thus stored temporarily in this page memory.

Next, the structure of the page memory 112 will be specifically explained with reference to FIG. 6.

Figure 6:
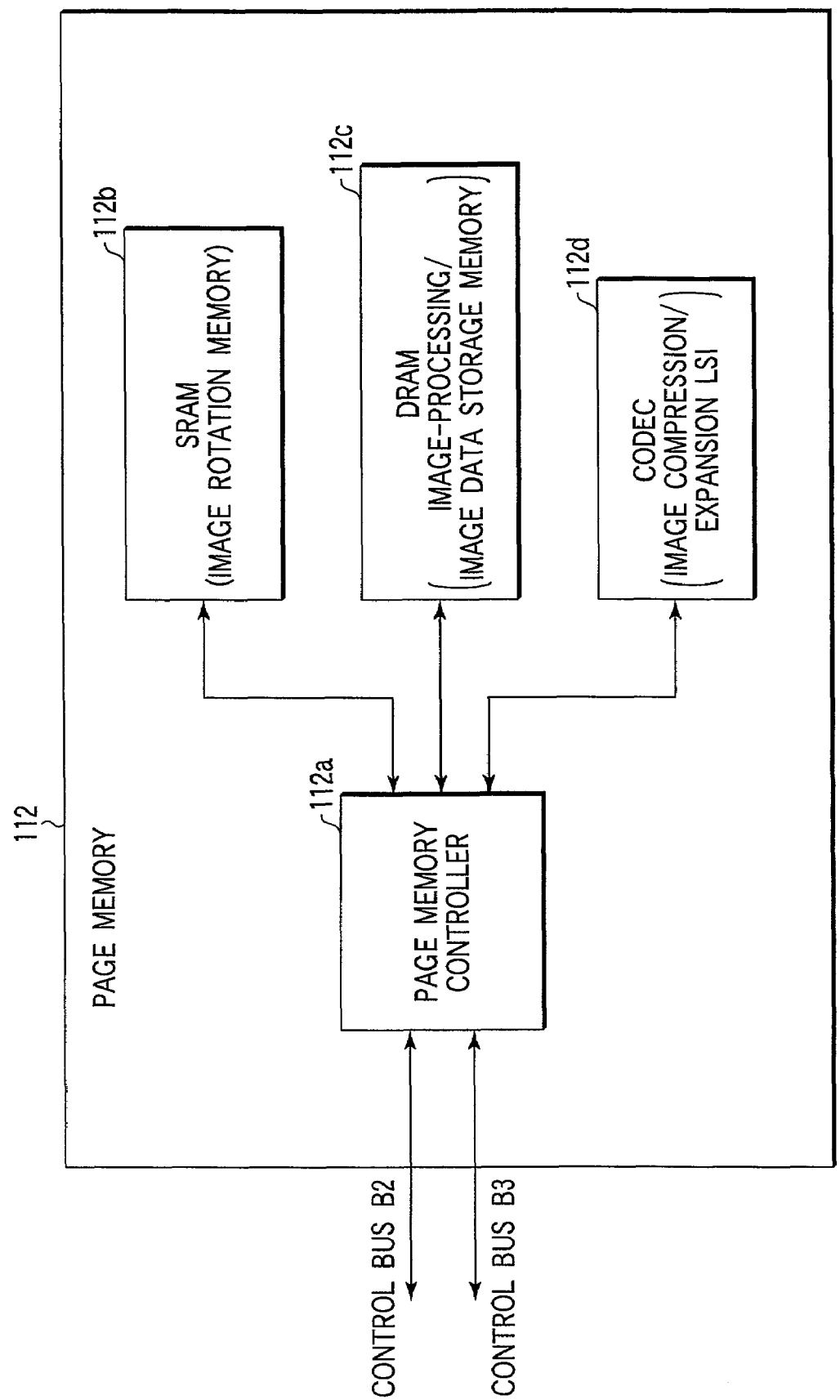
FIG. 6 is a diagram showing specifically the structure of a page memory 112.

In FIG. 6, the page memory 112 includes a large number of DRAMs 112c for storing image data, a SRAM 112b for rotation processing, and a CODEC 112d for expansion/compression. These components are all connected with the page memory controller 112a and are control targets of the page memory controller 112a.

The page memory controller 112a is connected with both of the control bus B2 and the image bus B3 and operates to mediate in access with the page memory 112 through the control bus B2 and the image bus B3.

Image processing such as compression, expansion, rotation, synthesis, or the like on image data on the page memory 112 is realized in a manner that the CPU 100 controls the page memory controller 112a through the bus controller 108 and the control bus B2.

Access to image data on the page memory 112 can be achieved from both of the control bus B2 and the image bus B3, and operation to mediate the access is performed by the page memory controller 112a.

Next, the structure of the image forming system according to the present embodiment will be shown in FIG. 7 and will now be explained.

Figure 7:
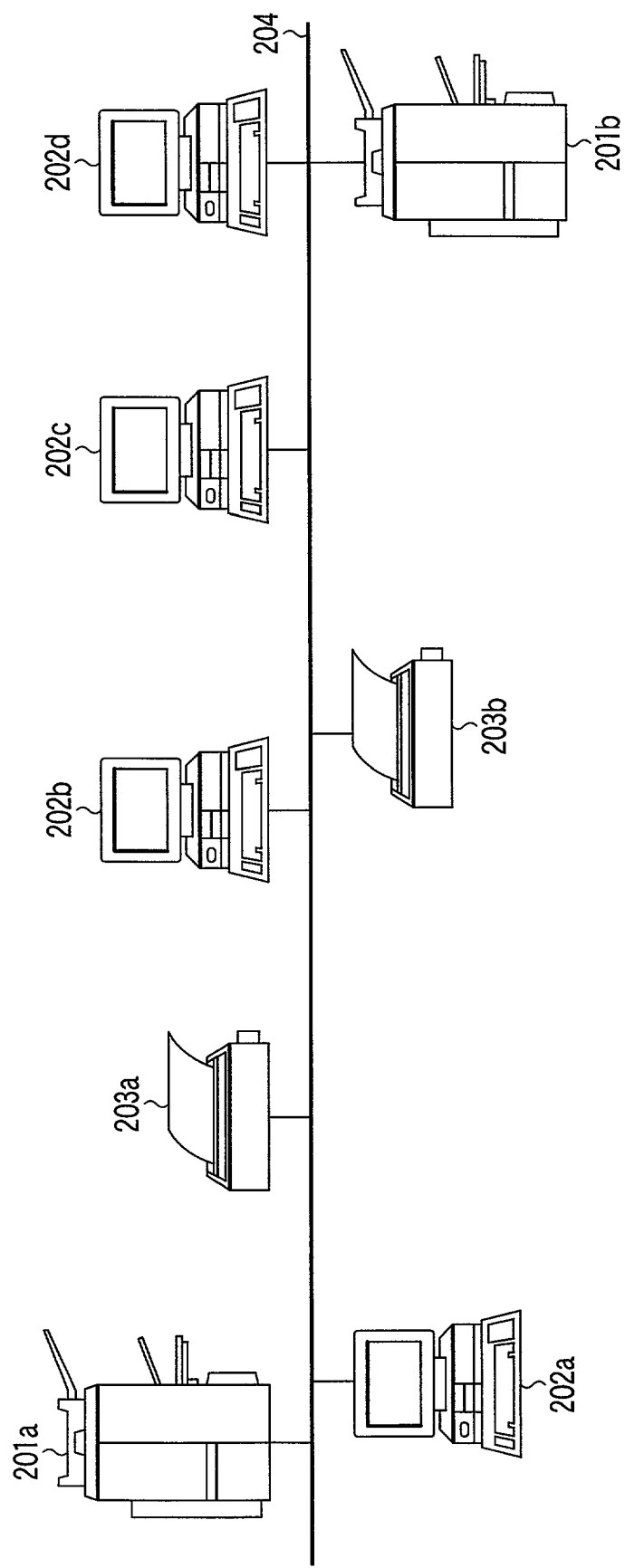
FIG. 7 is a view showing the structure of the image forming system according to the embodiment of the present invention.

As shown in FIG. 7, this image forming system is constructed by image forming apparatuses 201a and 201b, client personal computers 202a, 202b, 202c, and 202d, and network printers 203a and 203b, connected through a network 204. Of course, the numbers of these structural components are not limited to those described above.

From the client personal computers 202a to 202d, the print functions of the image forming apparatuses 201a and 201b can be used, like the print functions of the network printers 203a and 203b. Further, the scan functions of the image forming apparatuses 201a and 201b can be used as network scanners through the network 204.

The following explanation will be made of applications to be executed by the client personal computers of the image forming system according to the present invention. In the following explanation, this application will be called an Information Synchronizer.

FIG. 8 shows an example of a main window of the Information Synchronizer. As shown in FIG. 8, the main window of the Information Synchronizer is displayed in the form of a list.

This list-like display is called a stay list in the present invention. Items of the list are Filename, Size, Entry Date, Status, Destination, and Memo.

The items of the list will now be explained in more details.

The Filename field is a section which lists file names of electronic information as synchronization targets proposed in the present invention.

The Size field is a section which indicates the data amounts of electric information. The Entry Date filed is a section which indicates when electronic information was entered into the Information Synchronizer. That is, this is the section indicating the date and time when entered electronic information becomes a synchronization target proposed in the present invention.

The Status field is a section which indicates what status electronic information as a synchronization target is in. There are two kinds of statuses, i.e., check-in status and check-out status.

The check-in status indicates a state in which electronic information as a synchronization target exists in the stay list of the Information Synchronizer, i.e., the status in which the electronic information as the synchronization target is not being edited or processed.

The check-out status indicates a state in which electronic information as a synchronization target is taken out from the stay list of the Information Synchronizer by a user and can be edited or processed at the destination where the information is brought.

The Destination field indicates check-out destinations. In this example, this field displays any word of Paper, PC, and NONE which respectively indicate whether electronic information as a synchronization target which has been checked out exists on a sheet of paper or client PC or does not exist.

If the electronic information exists on a client PC, it indicates that the electronic information is in a state in which the electronic information can be edited or processed by another application of the client PC. In contrast, if electronic information as a synchronization target in the stay list is not checked out by a user, the Destination field indicates NONE.

The Memo field can be freely used by users. When this Memo field is double-clicked, an edit screen for memos appears. For example, a user can use this memo field for a memo concerning the electronic information as the synchronization target.

Next, the hierarchical structure of the Information Synchronizer menu is shown in FIGS. 9A to 9D and will now be explained.

Figure 9A:
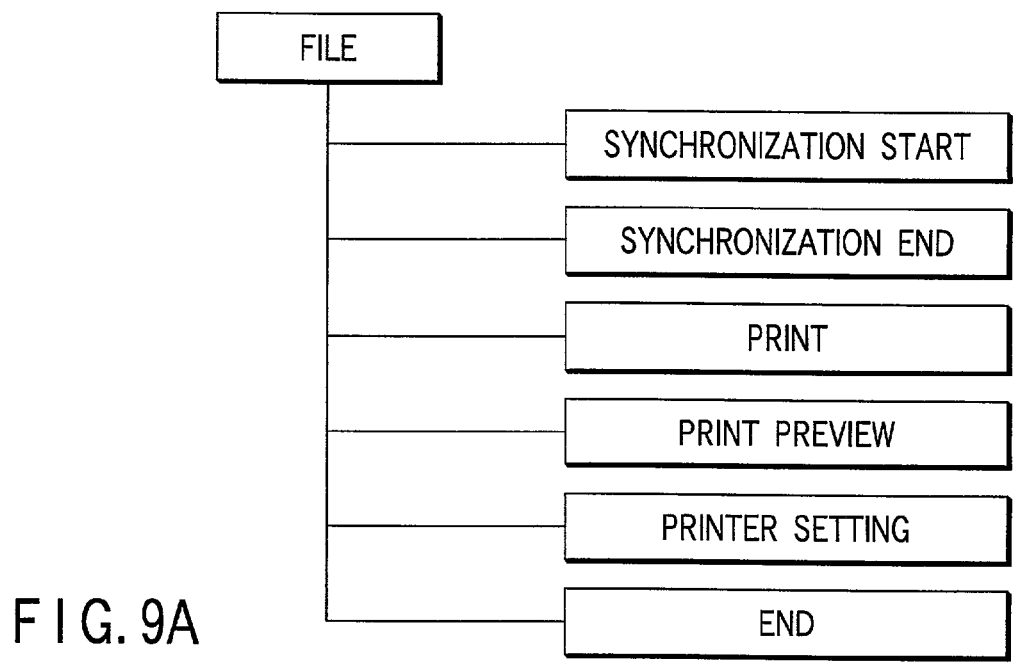
FIG. 9A is a diagram showing the hierarchical structure of the file menu of the Information Synchronizer.

As shown in FIG. 9A, the file menu contains Synchronization Start, Synchronization End, Print, Print Preview, Printer Setting, and Application Exit in a lower level. Items related to file operations on electronic information as a synchronization target exist in the category of this menu.

Figure 9B:
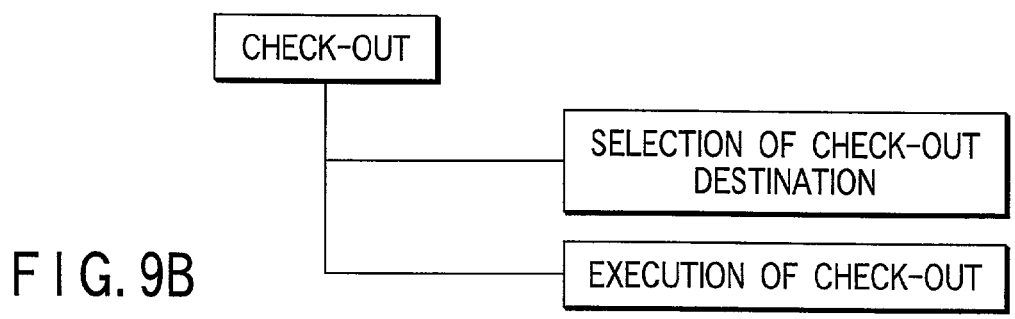
FIG. 9B is a diagram showing the hierarchical structure of the check-out menu of the Information Synchronizer.

As shown in FIG. 9B, the check-out menu includes selection of a check-out destination and execution of check-out in a lower level. Details of check-out will be described later.

Figure 9C:
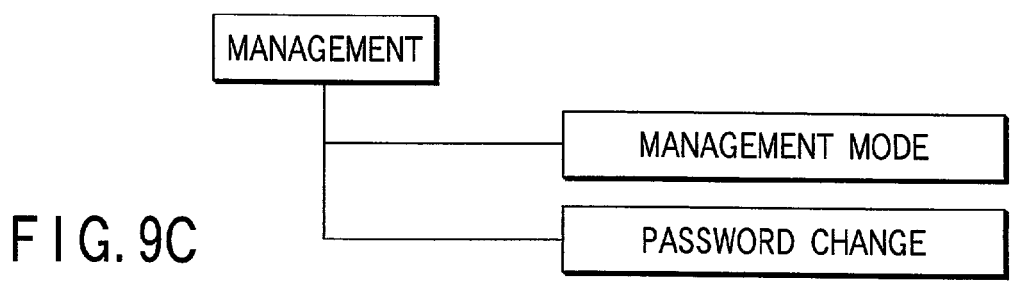
FIG. 9C is a diagram showing the hierarchical structure of the management menu of the Information Synchronizer.

As shown in FIG. 9C, the management menu includes menu items for changing to a management mode and for changing a password for entering into the management mode, in a lower level. Details of the management mode will be described later.

Figure 9D:
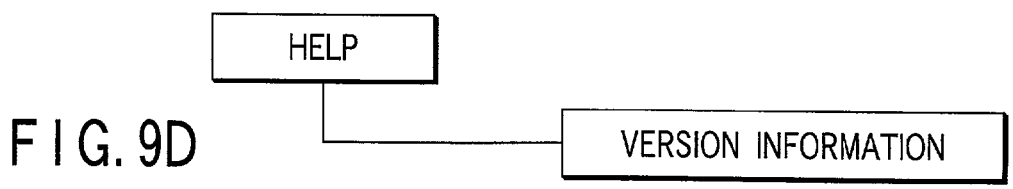
FIG. 9D is a diagram showing the hierarchical structure of the help menu of the Information Synchronizer.

As shown in FIG. 9D, the help menu includes version information in a lower level.

Explanation will now be made of a mechanism for performing synchronization of electronic information and unitary management by the Information Synchronizer. Suppose that the Information Synchronizer has been previously installed in each of the client PCs 202a to 202d constructing the image forming system according to the embodiment of the present invention.

Figure 10:
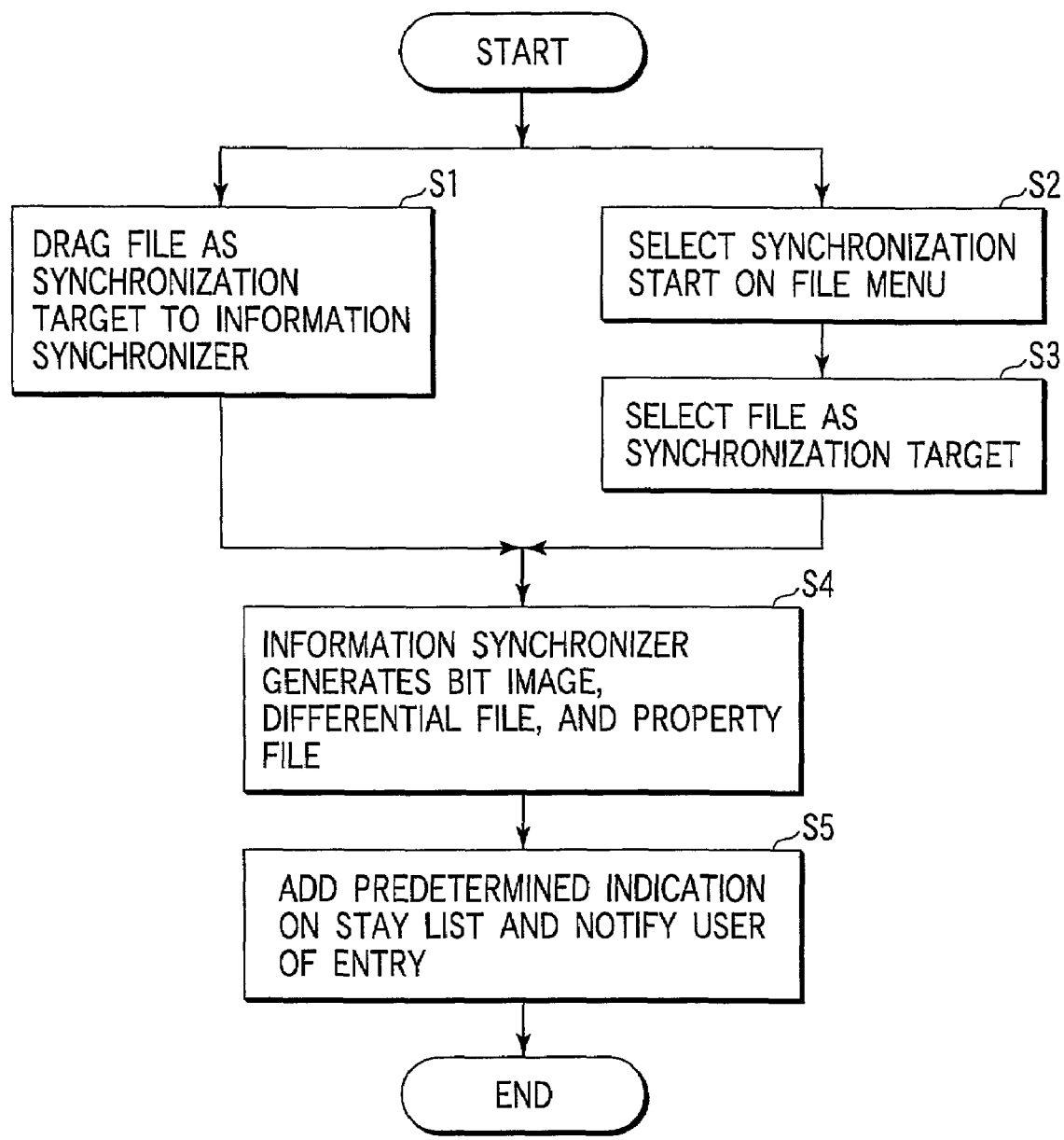
FIG. 10 is a flowchart specifically explaining an entry method for entering electronic information as a synchronization target into the Information Synchronizer.
Figure 11:
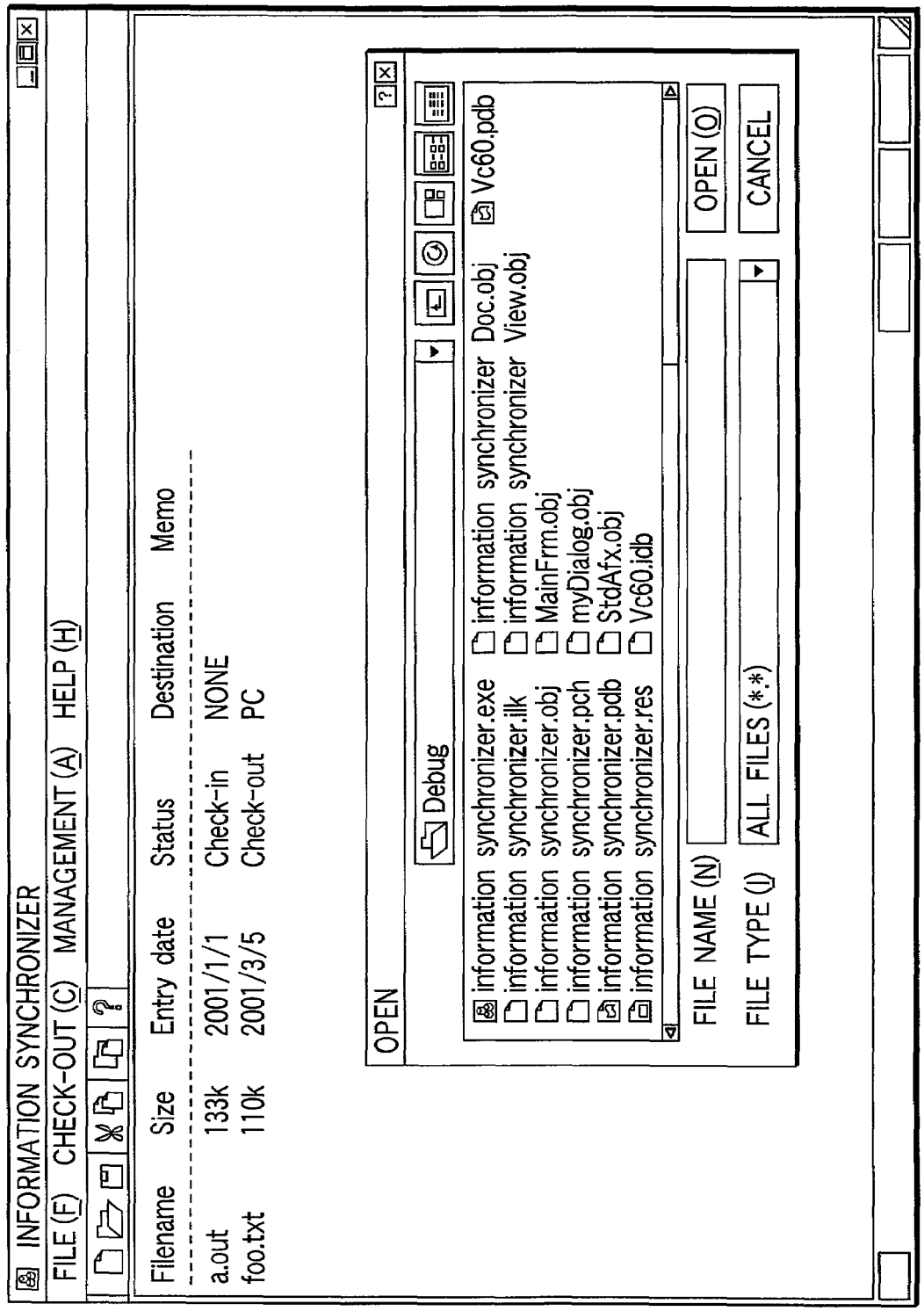
FIG. 11 is a view showing a state in which a window for selecting a file pops up.

At first, an entry method for entry to the Information Synchronizer of electronic information as a synchronization target will be explained in detail with reference to FIGS. 10 and 11.

A user drags a file of electronic information which the user owns in a client PC to the Information Synchronizer (step S1). The dragged electronic information of the user is entered, as information as a synchronization target, in the stay list under management by the Information Synchronizer.

The same operation can be executed from the file menu of the Information Synchronizer. In this case, there is an item for starting synchronization in the file menu, so the item is selected by a pointing device such as a mouse or the like (step S2). A window for file selection pops up so that the file as a target to be synchronized can be selected (step S3). This situation is as shown in FIG. 11.

When electronic information is entered in the stay list of the Information Synchronizer, the Information Synchronizer uses the GDI function of Windows to generate a bit image of the electronic information entered in the stay list, from the entered file. The Information Synchronizer manages added information as a finite difference of the bit image, based on the generated bit image.

Generated simultaneously is a property file which is used by the Information Synchronizer to manage synchronization of electronic information entered in the stay list.

Further, the Information Synchronizer internally has the electronic information as a synchronization target, also in the file format of the original electronic information (step S4).

The Information Synchronizer thus has the electronic information of the synchronization target in two forms, one being an internal bit image and the other being of a file format at the time of entry. This is because the edit target when a user checks in and out electronic information by a client PC is the file as it was entered and the bit image generated from the file as it was entered is the edit target when check-in and check-out is performed by a user with use of the printer function and scanner function of the image forming apparatus.

The Information Synchronizer adopts a mechanism which synchronizes information, using four files, i.e., information in the file format as it is entered in the stay list, a bit image generated therefrom, a finite-difference information, and property information.

After entry is thus completed, predetermined indications are added to the stay list, and the addition is notified to users (step S5).

Figure 12:
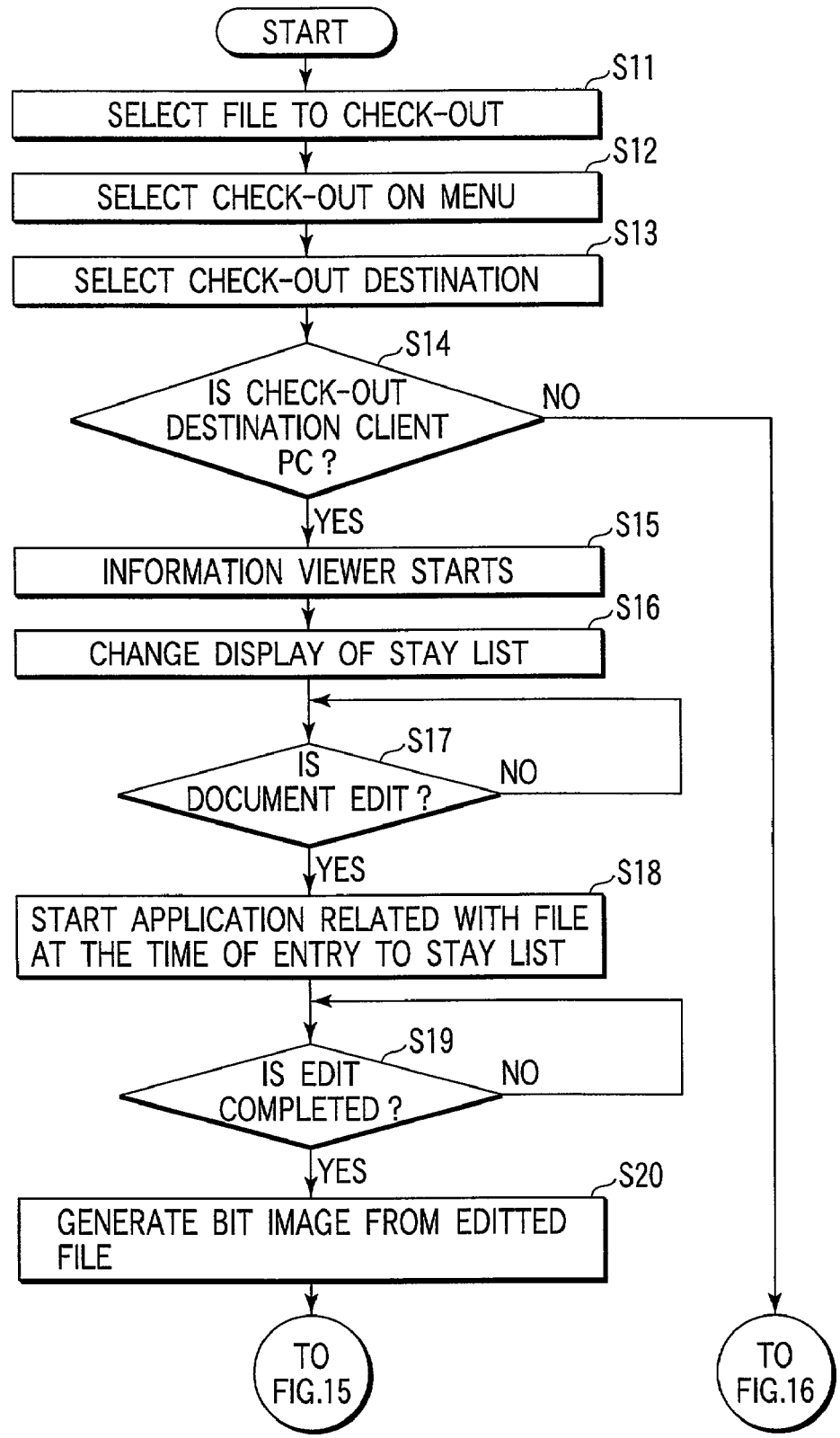
FIG. 12 is a flowchart specifically showing a procedure of check-out at a client PC.

Next, the procedure of check-out in a client PC will be specifically explained with reference to the flowchart shown in FIG. 12.

Explained at first will be a method of checking out information as a synchronization target from the stay list of the Information Synchronizer to a client PC, in order to enable processing or editing in a client PC.

A user selects a file to be checked out from the stay list by a mouse (step S11), and also selects the check-out in the menu (step S12).

Once the check-out is specified in the menu, the screen turns to a screen for selecting a check-out destination. On this screen, all print means in the image forming system are displayed in form of a list. The client PC used by the user is also displayed as a check-out destination in the list.

In this case, the client PC is selected (step S13).

Further, when the check-out execution is selected, an Information Viewer dedicated to the Information Synchronizer is started (step S15).

Figure 13:
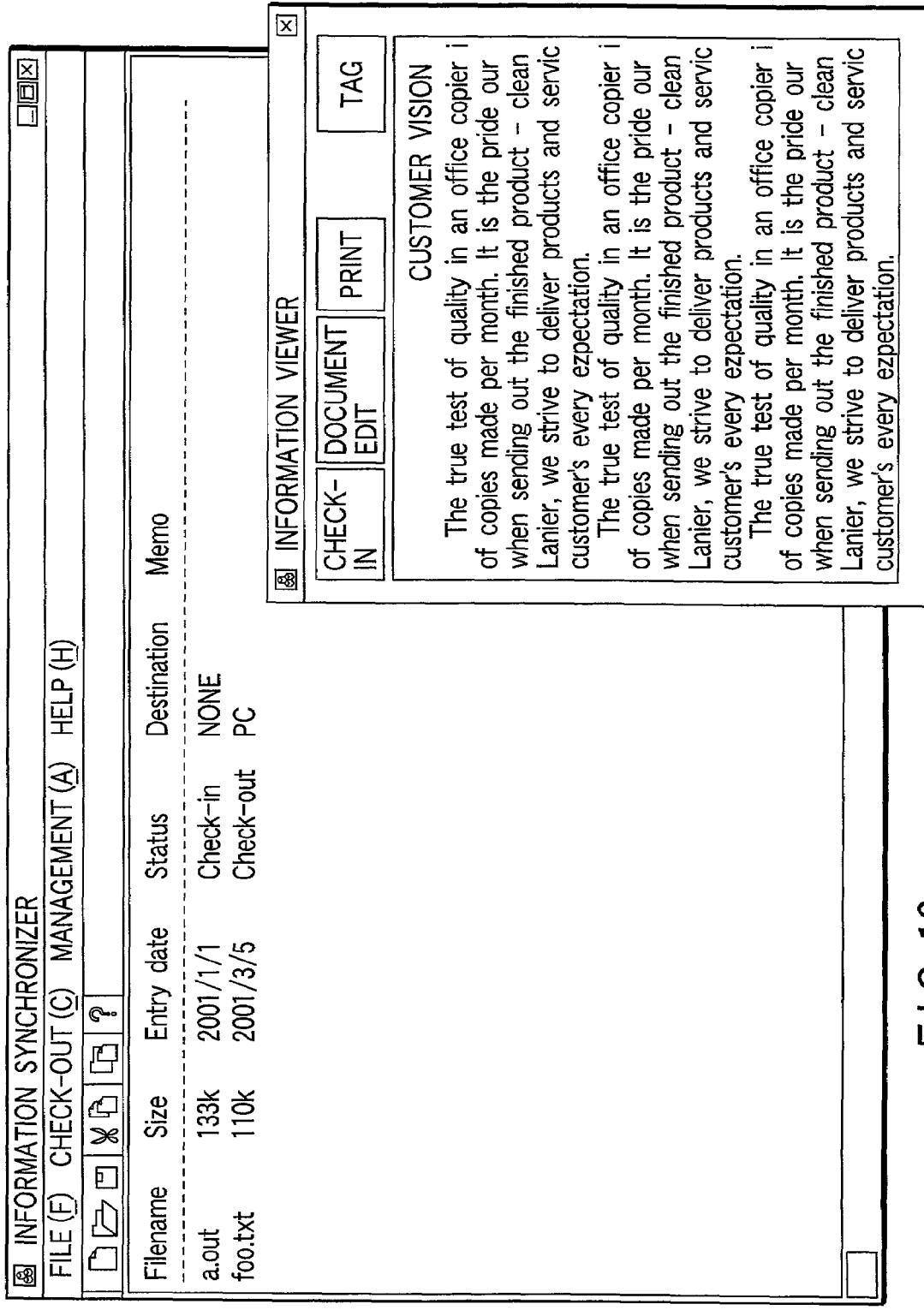
FIG. 13 is a view showing a state of Information Viewer.

A state of the information view is as shown in FIG. 13.

Data displayed on the screen of this Information Viewer is a bit image generated when the data was entered in the stay list. At this time, the Status field in the stay list shows an indication of Check-Out, and the Destination field shows an indication of the Client PC. Also, in the Information Synchronizer, if check-out is executed again with respect to an information item whose Status field shows an indication of Check-Out, an error message is indicated which says that the information item is checked out at present. Thus, double check-out cannot be done but the identity of entered information can thus be maintained (step S16).

When a user desires to edit and process the information as the synchronization target checked out in the method described above, the user clicks a document edit button on the Information Viewer (step S16).

When the document edit button is clicked, the Information Viewer starts an application related to the file format used when the information as the synchronization target was entered (step S18).

Further, the user is allowed to edit and process the checked-out information (step S19). At this time, the information as the edit target is information of the file format as it was entered and is managed by the Information Synchronizer.

Next, when the user ends the application related to the information as the synchronization target or saves the file after editing, the Information Synchronizer uses the GDI to generate a bit image again. Further, the display screen of the Information Viewer is updated (step S20).

Next, the flow of check-in from a client PC will be explained with reference to FIG. 14. When a user selects the check-in from the menu on the Information Viewer (step S21), the Information Viewer itself ends (step S22). In the stay list, indication of this information as a synchronization target in the Status field turns to an indication of check-in (step S23). At this time, the indication in the Destination field turns to NONE. The operation of check-in then ends.

Next, specific explanation will be made of a procedure of checking out to a network printer from the stay list in the image forming system of the present invention. The process until a file to be checked out is selected is the same as that in the procedure of check-out to a client PC.

When a file as a check-out target is selected on the stay list and a check-out button is pressed on the menu of the tool bar, a window of a list of check-out destinations pops up. Since the above explanation has been made of editing on information in a client PC, a client PC is selected as a check-out destination. In contrast, a network printer in the image forming system is selected (step S31) in the following explanation.

When a printer is selected, an input screen for constructing a print job appears. On this screen, information concerning a print size and a print magnification is inputted (step S32).

Parameters inputted at this time are held and managed as check-out information in a property file when the Information Synchronizer checks out information of the synchronization target onto a sheet of paper (step S33). The Information Synchronizer uses these parameters to attain finite difference information of a bit image when check-in is carried out again by the scan function of the image forming apparatus described later.

When inputting of parameters necessary for checking out information as a synchronization target onto a sheet of paper thus ends, these parameters are added to a print output, expressed as a barcode by the Information Synchronizer (step S34).

The Information Synchronizer adds the paper on which the barcode is printed, as a cover page, to the print output and performs printing (step S35). For example, if there are 11 pages of images as synchronization targets, the paper on which the barcode is printed is added as one page, so 12 pages are outputted from the image forming apparatus or network printer. FIG. 16 shows an example of the cover page with the barcode.

Thus, the Information Synchronizer changes the indication in the Status field to an indication of check-out (step S36), and ends the check-out of the information as a synchronization target to a sheet of paper. The information whose check-out to a sheet of paper has been completed can be added directly with information if a user adds anything by the user's own handwriting.

In this case, the Status field indicates Check-Out on the display of the stay list of the Information Synchronizer, and then the Destination field indicates Paper. If check-out is tried again of information as a synchronization target which is being checked out, a message saying that the file which is a check-out target is currently checked out is displayed, so double check-out cannot be done.

As described above, a similar procedure is taken in the case of checking out information onto a sheet of paper.

Figure 17:
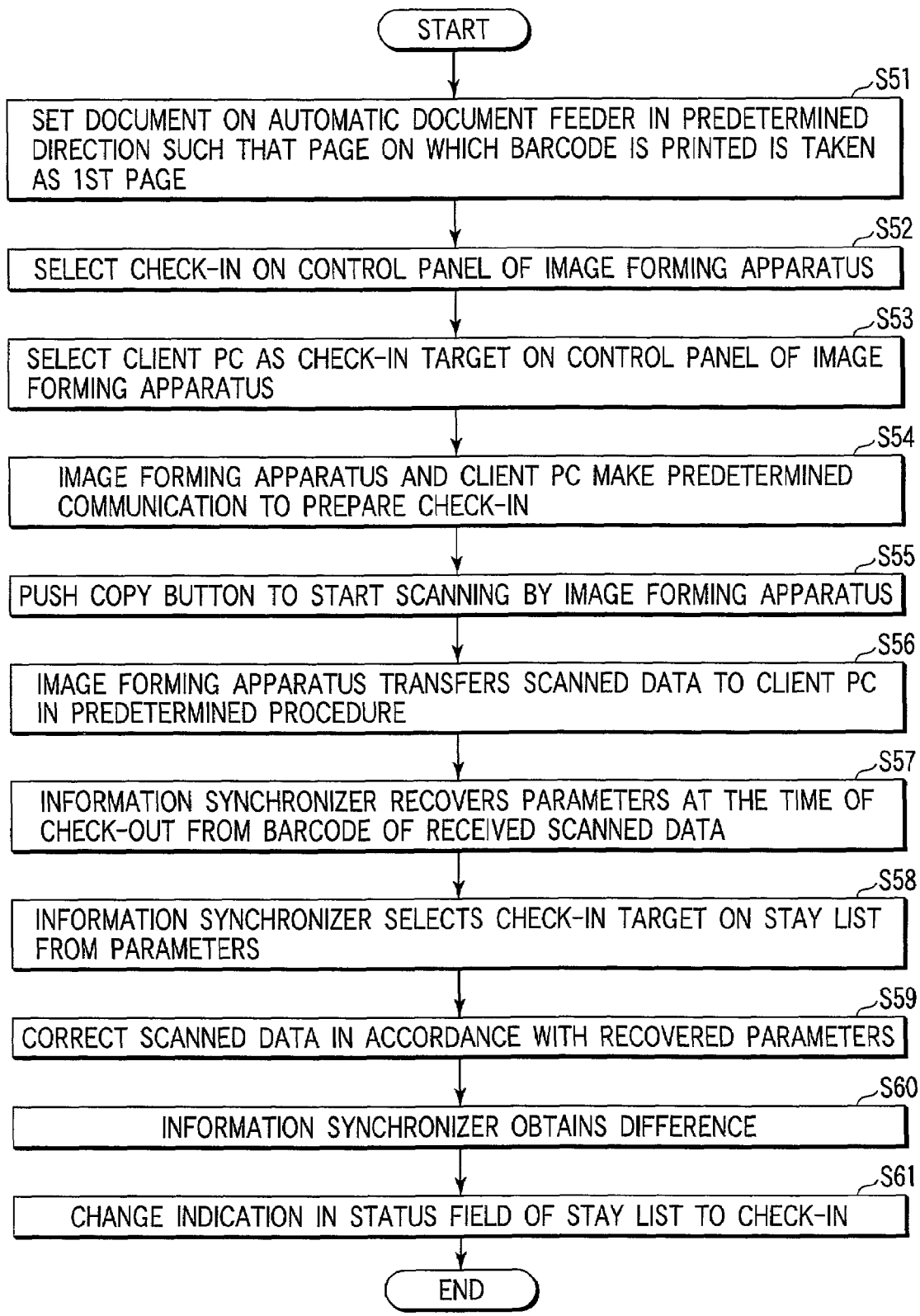
FIG. 17 is a flowchart specifically explaining a flow of check-in from a sheet of paper to information as a synchronization target.

Next, the flow of check-in from a sheet of paper to information as a synchronization target will be explained in detail with reference to FIG. 17.

A user can check in a printed material again, which has once been checked out from the printer section of the image forming apparatus or a network printer in the image forming system, to the Information Synchronizer, using the scanner section of the image forming apparatus.

The user sets a checked-out original document on the ADF in a predetermined direction, such that the sheet on which a barcode is printed is situated as the first page (step S51).

The user then specifies Check-In on the control panel of the image forming apparatus (step S52). When Check-In is thus specified by the image forming apparatus, the display changes to the selection screen of the client PC on which the Information Synchronizer to check in runs. On this screen, all of the client PCs which form section of the image forming system are listed and displayed.

The user then specifies the client PC to check in, on the control panel of the image forming apparatus (step S53).

In the image forming system, when check in at the client PC is selected on the control panel of the image forming apparatus by the user, the image forming apparatus and the Information Synchronizer running on the specified client PC communicate with each other in a predetermined procedure through the network, to make preparation for check-in from the scanner section of the image forming apparatus (step S54).

As the user pushes down a copy button on the image forming apparatus, the automatic document feeder feeds the original document to the document read table of the scanner section, and the sheets of the original document are sequentially scanned (step S55). The image forming apparatus sends scanned image data to the Information Synchronizer of the client PC which was previously specified in a predetermined communication procedure (step S56).

Further, the Information Synchronizer running on the client PC receives the scanned image data through the network.

The first page of the scanned image data must always be a barcode which has been converted from the information as it was checked out onto a sheet of paper. Therefore, the Information Synchronizer subjects the barcode to predetermined processing, to recover the parameters that the checked out barcode information represents.

Further, the Information Synchronizer selects a check-in target from the stay list based on the recovered parameters (step S58). Since second and later pages of the scanned data are information which has been checked out onto a sheet of paper, the Information Synchronizer changes the magnification, corrects the resolution, etc., in accordance with the recovered parameters to convert the information into a state which can be compared with the bit image before check-out.

As described above, management of an image checked in from the scanner section of the image forming apparatus is managed as a bit image by the Information Synchronizer.

That is, a finite difference between the image checked in from the scanner section of the image forming apparatus and the bit image at the time of preceding check-out is attained, and the checked-in image is thus managed by the Information Synchronizer (step S60).

Thus, the indication in the Status field of the stay list is changed to Check-In (step S61), and thus, the user accomplishes check-in from a sheet of paper.

Meanwhile, in the Information Synchronizer adopted in the present invention, indexes can be managed with respect to electronic information as synchronization targets.

For example, a tag can be electronically marked on the display shown in FIG. 13, i.e., an image displayed on the Information Viewer. In this case, if a tag is selected on the menu screen of the Information Viewer, an electronic tag is marked on the page displayed on the Information Viewer. Internally, information concerning the tag is written into the property file managed by the Information Synchronizer, and is thus managed.

In this tagging function, by selecting a next tag from the menu of the Information Viewer, the display of the Information Viewer can jump to the page marked with the next tag. Similarly, by selecting a preceding tag from the menu of the Information Viewer, the display of the Information Viewer can jump to the page marked with the preceding tag.

As shown in FIG. 18, if an electronic tag is expressed as information on a sheet of paper, it is expressed as the color of an end section of the paper. If the information of a synchronization target marked with this electronic tag is checked out in the procedure described above, the Information Synchronizer changes the color of the end section of the paper, and thus, the same advantage as a tag paper can be attained.

Changed and marked colors of the end sections on papers are printed by shifting electronic tags gradually toward the end section of the paper at a predetermined pitch in the order from the smallest page number.

Next, with reference to FIG. 19, explanation will be made of advantages of tags in the case of check-in from a sheet of paper. In the present invention, this way of thinking with use of tags can be applied to the case where information as a synchronization target is checked out to a sheet of paper in accordance with the procedure described above.

If information as a synchronization target is outputted to a sheet of paper, a tag can be realized by adhering a predetermined seal to a predetermined position on the paper on which checked-out information is printed.

When check-in is carried out again from the image forming apparatus, the seal is recognized as a tag by the Information Synchronizer, like identification of a barcode as described above, and is converted into tag information dealt with by the Information Viewer, which is stored in a property file and managed and operated.

If checked-out information is lost or if the paper on which a barcode is printed is lost, check-in cannot be achieved again by the Information Synchronizer.

To prevent this problem occurring, the Information Synchronizer has a management mode. That is, when the management mode is selected from the menu of the Information Synchronizer, a window for inputting a password pops up and a user inputs a predetermined password. The password is collated. If it coincides with a predetermined password, the Information Synchronizer swaps to management mode.

In this mode, the status of information of a synchronization target being checked out can be changed to the status before the last check-out. The Information Synchronizer always internally maintains the status before check-out in order to keep electronic information synchronized.

Therefore, the status can be returned to a preceding status, by making the present check-out invalid. In this manner, the Information Synchronizer has a mechanism ready for a case where check-out to a sheet of paper is carried out and check-in cannot be carried out again.

Finally, explanation will be made of the case where synchronization ends.

If a user completes an editing operation on information and excludes it out from synchronization targets, the user selects a file which should be excluded from synchronization targets, on the stay list. The user further selects Synchronization End.

When the Synchronization End is thus selected, the Information Synchronizer synthesizes the bit image of information, which is internally managed and has been a synchronization target, and finite information thereof, to generate a PDF file on a disk of a client PC.

Upon completion of generation of the PDF file, the Information Synchronizer stops displaying the information specified on the stay list, and cancels the file of the synchronization target which has been internally held, the bit image thereof, the difference information of the bit image, and the property file.

The Information Synchronizer thus finishes the synchronization of the information by generating a PDF file.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming system comprising a composite type image forming apparatus, a network printer, and a client personal computer which are mutually connected to be able to communicate with each other through a network, wherein
the composite type image forming apparatus includes a scanner section which reads an image of an original document, and a printer section which performs predetermined printing, based on image information obtained by the scanner section or transmitted through the network from the client personal computer,
the network printer includes a communication section which receives image information transmitted from the client personal computer or the composite type image forming apparatus through the network, and a printer section which performs printing based on the image information,
the client personal computer includes a storage section which stores at least application software to display a list having a predetermined structure for synchronizing electronic information and image information, and electronic information, a display section which displays the list, and a control section which starts the application software, and checks in electronic information stored in the storage section or image information transmitted from the composite type image forming apparatus through the network onto the list or checks out electronic information, which exists on the list displayed on the display section, onto the image forming apparatus or the network printer, outputs the electronic information from the image forming apparatus or the network printer and if the outputted information on a sheet of outputted paper is subjected to processing, addition, or correction, reflects, in the electronic information, the changed information on the sheet of outputted paper, and if image information from the composite type image forming apparatus is checked in by the control section, information newly added to an image forming medium is managed, by means of a finite difference between the image information checked in and bit image information concerning electronic information before checking-out.

2. The system according to claim 1, wherein
the checking out done by the control section means printing onto a sheet of paper, and
by the network printer and the composite type image forming apparatus, incidental information constructing a print job and including at least created date and time, a creator, and a print size, which is incidental to checked-out electronic information, is symbolized to be optically readable and is printed.

3. The system according to claim 1, wherein if checking-out is performed at the client personal computer, a file format as an edit target on the client personal computer is based on a file format when information thereof as a synchronization target is entered in the application software.

4. The system according to claim 1, wherein the control section manages synchronization, using two kinds of file structure.

5. The system according to claim 1, wherein
if electronic information is checked in to itself and processed, the control section sets an electronic retrieval tag corresponding to a tag, and
if the control section checks out the information including tag data of the tag thus set to the composite type image forming apparatus or the network printer, the composite type image forming apparatus or the network printer performs printing output, with an end section of a image forming medium colored at a predetermined position.

6. The system according to claim 5, wherein the electronic retrieval tag is converted into a state which can be retrieved by visual discernment of a user.

7. The system according to claim 1, wherein
addition of index information including at least a tag, a mark, or an index to the image information is achieved by adhering a predetermined seal, and
the control section deals with the seal as a retrieval tag of information, when image information is checked in from the composite type image forming apparatus.

8. A method of forming an image by an image forming system comprising a composite type image forming apparatus; a network printer, and a client personal computer which are mutually connected to be able to communicate with each other through a network, the method comprising:

a step of storing at least application software to display a list having a predetermined structure for synchronizing electronic information and image information, and electronic information, in the client personal computer;

a step of displaying the list;

a step of starting the application software and checking in stored electronic information or image information transmitted from the composite type image forming apparatus through the network, onto the list;

a step of checking out electronic information, which exists on the list, onto the image forming apparatus or the network printer; and a step of outputting the electronic information from the image forming apparatus or the network printer and if the outputted information on a sheet of outputted paper is subjected to processing, addition, or correction, reflecting, in the electronic information, the changed information on the sheet of outputted paper, wherein if image information from the composite type image forming apparatus is checked in, information newly added to an image forming medium is managed, by means of a finite difference between the image information checked in and bit image information concerning electronic information before checking-out.

9. The method according to claim 8, wherein
the checking out means printing onto a sheet of paper, and
by the network printer and the composite type image forming apparatus, incidental information constructing a print job and including at least created date and time, a creator, and a print size, which is incidental to checked-out electronic information, is symbolized to be optically readable and is printed.

10. The method according to claim 8, wherein if checking-out is performed at the client personal computer, a file format as an edit target on the client personal computer is based on a file format when information thereof as a synchronization target is entered in the application software.

11. The method according to claim 8, wherein synchronization is managed, using two kinds of file structure.

12. The method according to claim 8, wherein
if electronic information is checked in to itself and processed, an electronic retrieval tag corresponding to a tag is set, and
if a control section checks out the information including tag data of the tag thus set to the composite type image forming apparatus or the network printer, the composite type image forming apparatus or the network printer performs printing output, with an end section of a image forming medium colored at a predetermined position.

13. The method according to claim 12, wherein the electronic retrieval tag is converted into a state which can be retrieved by visual discernment of a user.

14. The method according to claim 8, wherein
addition of index information including at least a tag, a mark, or an index to the image information is achieved by adhering a predetermined seal, and
the seal is dealt with as a retrieval tag of information, when image information is checked in from the composite type image forming apparatus.

* * * * *